J. W. AYLSWORTH.
METHOD OF MAKING PHONOGRAPH RECORDS.
APPLICATION FILED MAR. 8, 1911.

1,230,816.                              Patented June 19, 1917.

Witnesses:
Frank D Lewis
Frederick Pachmann.

Inventor:
Jonas W. Aylsworth
by Frank L. Dyer
his Atty.

UNITED STATES PATENT OFFICE.

JONAS W. AYLSWORTH, OF EAST ORANGE, NEW JERSEY, ASSIGNOR, BY MESNE ASSIGNMENTS, TO NEW JERSEY PATENT COMPANY, OF WEST ORANGE, NEW JERSEY, A CORPORATION OF NEW JERSEY.

METHOD OF MAKING PHONOGRAPH-RECORDS.

1,230,816.  Specification of Letters Patent.  Patented June 19, 1917.

Application filed March 8, 1911. Serial No. 613,114.

*To all whom it may concern:*

Be it known that I, JONAS W. AYLSWORTH, a citizen of the United States, and a resident of East Orange, in the county of Essex and State of New Jersey, have made a certain new and useful Invention in Methods of Making Phonograph-Records, of which the following is a description.

The object of the present invention is to produce a phonographic record having a surface layer of extremely hard material, such as the condensation products which form the subject matter of applications, Serial Numbers 496,060, 543,238 and 604,982, upon which United States Patents Nos. 1,102,630, 1,020,593 and 1,046,137 have been granted respectively. Hard phenolic condensation products are difficult to mold by the method of hardening in the mold, and they require considerable time for the operation. The present invention seeks to produce a phonograph record comprising the valuable properties of such products without the difficulties heretofore encountered. In a previous application, Serial No. 543,236, filed February 11, 1910, upon which United States Patent No. 1,146,388 has been granted, a method is described of forming the sound record after the material has been hardened, in which case the composition is designed to be somewhat plastic when hot. The present method is an improvement over the method therein disclosed in several important particulars. In pressing a substance which is plastic when hot, unless a high degree of plasticity is obtainable in the composition, there is difficulty in getting the impression perfectly all over the record, especially if it be a disk of considerable diameter. These difficulties are due to unevenness of the mold, which may be only in spots, or may be due to a variation in the thickness between the record face and the back, which causes an excessive pressure in the high spots and a deficiency of pressure in the low spots; and, where the material is not sufficiently plastic, this irregularity is not compensated for, and the result is a record in which the impressions are not perfectly taken all over. To overcome this, excessively high hydraulic pressures are required, which are objectionable on account of their tendency to spoil the record surface and distort the mold, as well as being expensive because of the equipment required when such pressures are used.

The present invention in its preferred embodiment is accomplished by making a surface layer of a condensation product on a thin sheet of fabric, such as muslin or paper. This surface layer is preferably made of condensation products of phenol and formaldehyde or other substances containing the methylene radical, which products also contain a plasticity or solid solvent ingredient, such as one of those described in my applications Serial Nos. 496,060 and 604,982. Such products are described in my application, Serial No. 604,982 and are there termed "hot plastic condensation products," that is products which in their final state will soften sufficiently by heat to readily take an impression. The preferred composition for the surface layer is as follows:

Condensation product 100 parts by weight.
Solid solvent 15 to 40 parts by weight.
Wood flour or cotton flocks 15 to 30 parts by weight.

While, however, I prefer to use the above composition, various other hard substances such as celluloid, cellulose acetate, and casein may be used and fall within the scope of my invention.

The record is made by taking two such surface layers or veneers, which have been previously fully hardened, inserting between them a blank of a plastic composition which will not harden by heat, and which may be of entirely different composition from the surface layers. These layers and the blank are pressed in a heated mold where they are united and formed into a record of desired shape, the record impression being preferably pressed into the surface of the veneer at the same time.

Compositions for the blank may be the ordinary shellac mixtures with wood pulp as a loading material, or compositions comprising wood pulp or other filling agents and a fusible condensation product such as the well known shellac substitutes, and the substance which I term "phenol resin" in my applications Serial Nos. 496,060 and 541,764, upon which United States Patents 1,102,630 and 1,146,387 have been granted respectively.

This blank when heated becomes sufficiently plastic to flow under a moderate pressure of say 600 to 1500 pounds to the square inch, and forms a backing which is yielding under the action of heat and pressure, so as to form a hydraulic equalizer of the applied pressure, so that no matter how uneven or irregular the mold surfaces may be, the pressure is distributed evenly on the veneer surfaces. The difference between the veneer and the blank or center portion of the record is that the veneer becomes simply softened by heat so it may be embossed readily, but does not have sufficient flowing qualities to enable it to be successfully used alone, excepting under special conditions; whereas, the internal part or blank is plastic when heated and will flow readily, hardens by cooling, may be made plastic again by heating any number of times and will not harden by heating.

The function of the fabric in the surface layer is to reinforce the same so that the layers or veneers may be readily handled without breaking, and so that the same may not break because of the flowing action of the internal blank while pressing. It also contributes enormously to the strength of the finished product.

The character of the fabric is important on account of the tendency to form cranks in the surface if the fabric is too stiff and unyielding and has a different coefficient of expansion and contraction from the material of the surface. Materials having such difference in coefficient of expansion may be used if the fabric is so chosen as to be yielding as a whole. Loosely woven cotton cloth, such as muslin, is preferable. Loose paper fabric such as filtering paper or Japanese rice paper may also be used, but they do not contribute so much to the strength of the product, as the cotton fabric. I have also found that when a condensation product is coated by rolling or pressing onto the cotton fabric in thin layers, the air is entirely removed, which is an important advantage in record surfaces.

In order that my invention may be better understood, attention is directed to the accompanying drawing forming a part of this specification and in which—

Figure 1:
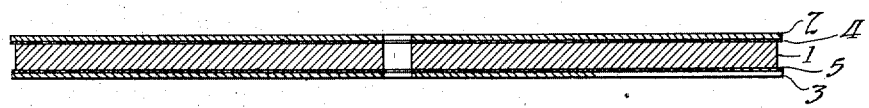
Figure 1 represents a central vertical cross section showing the blank, the fabric and the surface veneers in position to be molded.
Figure 2:
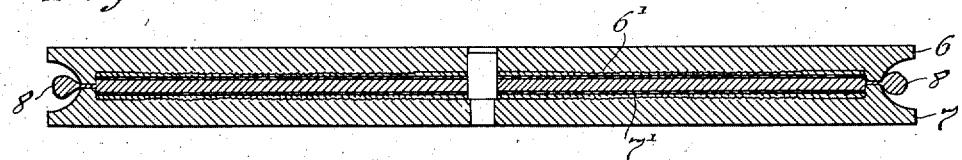
Fig. 2 represents a similar view, showing the same parts in the mold after the pressure has been applied.
Figure 3:
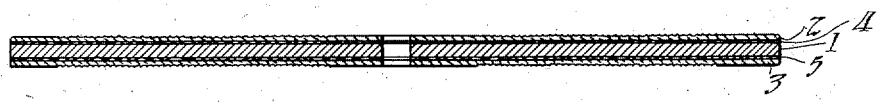
Figs. 3 and 4 represent central vertical sections of finished records of different thicknesses. In all the views corresponding parts are designated by the same reference numerals.

Referring to the drawings, 1 represents the central blank; 2 and 3, the surface veneers, and 4 and 5 the fabric on which the veneers are coated. The mold shown herein is what is termed a "flash mold", that is, a mold in which the excess material is forced out between the opposing parts 6 and 7 of the mold as shown at 8 in Fig. 2, when these parts are brought together in regulating the thickness of the product. The parts 6 and 7 of the mold are formed with matrices, 6' and 7' respectively; so that the record impressions are formed in the veneer simultaneously with the formation of the record. As shown in Fig. 1, the plastic blank 1 is of less diameter than the finished record so that in molding the record it will readily flow and fill the inner cavity between the veneer surfaces.

Figure 4:
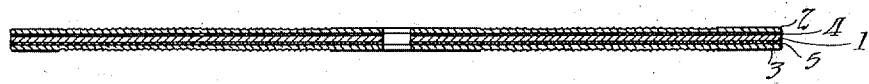

When it is desired to make a very thin disk record the blank is made thin, but when the pressure applied to the mold is completed, the excess of the inner material will be mostly squeezed out, leaving simply two veneer surfaces stuck together by the composition of the blank, as shown in Fig. 4. When a cylindrical record is formed, the process is exactly similar, except that the veneer and the blank are made in cylindrical form; but with a cylindrical record, it is not necessary to have the veneer upon both inside and outside surfaces, whereas on disk records, it is necessary to put the veneer on both sides to prevent warping.

The present invention is applicable to all kinds of phonograph records and other objects which it is desired to mold with a veneer surface.

Suitable compositions for the blank are wood flour, 50 to 100 parts, fusible condensation product, shellac or shellac substitute, colophony, or other binding gum, 50 to 100 parts. The composition of the blank may be adjusted and may be more or less plastic to suit the requirements of the particular veneer used. For instance, a veneer which requires a higher pressure to form the impression will require a stiffer plastic blank, and one which will take the impression readily at a lower pressure will require a blank which is more plastic.

In forming a veneer of an infusible phenolic condensation product, the cloth or fabric is placed on a sheet of polished metal, such as tin plate, and a blank of the unhardened condensation product is placed on the same and another piece of polished metal placed on top of this. Then the same is submitted to heat between two hot plates and a moderate pressure applied after the material has softened sufficiently to flow, whereby it is evenly distributed through and on the muslin, after which a higher temperature is given to the same, to harden the same by chemical action into its final, non-fusible hard state, care being taken that the reaction temperature is not reached before the material has been properly distributed over the surface of the muslin. With some forms of condensation products, such as those described by Baekeland and others, this final hardening should be done under pressure. When the compositions referred to in applications Serial Nos. 604,982, 496,060, and 543,238 are used, it is not necessary to maintain pressure during the last stage of the operation or the hardening reaction. The pressure may be released, and the hardening may be done between the same hot plates which are used in distributing, or the coated muslin placed between the two metal sheets may be removed and placed in an oven, and there hardened at the minimum reaction temperature until it becomes infusible; and then to complete the hardening, the temperature may be raised considerably above the reaction temperature, which hastens the operation. After cooling, the metal sheets are readily detached. Another method of forming the veneer is to coat the muslin on calender rolls, similar to the method of coating rubber on fabrics, hardening the same on heated drums or in ovens, and subsequently punching out the veneer blanks from these coated sheets.

The reaction temperature for the above mentioned composition lies between 200 and 250 degrees F., varying somewhat with the nature of the composition used.

The fundamental principle which contributes to the success of the present invention lies in having a yielding pressure-distributing internal part and a hard surface layer. It is obvious that other materials than those mentioned might be used for both the surface layer and for the internal part.

The plastic blank may be pressed to the full size of the record or other object, or as stated above, it may be less than the full size, so that in the final operation it will flow and entirely fill the inner cavity between the veneer surfaces. When a very thin disk record is made, the internal material is preferably made heavy by loading with heavy powders, such as metal powders, barium sulfate, etc. This is particularly desirable where the form of cut on the record is what is known as the up and down cut, which prevents the thin record from vibrating to such an extent as to weaken the volume of sound produced. Or the inner part may be lead or tinfoil.

The improved article of manufacture herein described is claimed in a divisional application Serial No. 160,964, filed April 9, 1917.

While I have mentioned certain preferred materials for the various parts of my improved record, various other materials may be used; and my invention is limited only as defined by the terms of the appended claims.

Having now described my invention what I claim as new and desire to secure by Letters Patent of the United States is as follows:

1. The process of making sound records which consists in coating two sheets of woven fabric with veneers of hard infusible material adapted to become slightly softened but not sufficiently plastic to flow when hot, forming a blank of material which is sufficiently plastic to flow when hot and hard when cold, inserting said blank between said sheets of fabric and simultaneously uniting said parts, molding the same into the desired shape, and forming record impressions in the outer surfaces of said veneers by heat and pressure, substantially as set forth.

2. The process of making sound records which consists in coating a sheet of woven fabric with a veneer of a hard infusible condensation product of phenol and a substance containing the methylene radical, forming a blank of material which is sufficiently plastic to flow when hot and hard when cold, and simultaneously uniting said parts, molding the same into the desired shape and forming a record impression in the veneer by heat and pressure, substantially as set forth.

3. The process of making sound records which consists in coating two sheets of woven fabric with veneers of a hard infusible condensation product of phenol and a substance containing the methylene radical, forming a blank of material which is sufficiently plastic to flow when hot and hard when cold, inserting said blank between said sheets of fabric, and simultaneously uniting said parts, forming the same into the desired shape, and forming record impressions in the outer surfaces of the veneer by heat and pressure, substantially as set forth.

4. The process of making sound records which consists in coating a sheet of woven fabric with a veneer of a hard infusible material adapted to become slightly softened but not sufficiently plastic to flow when hot, forming a blank of material which is sufficiently plastic to flow when hot and hard when cold, placing said blank in contact with said fabric, and uniting said parts and forming the same into the desired shape by heat and pressure, substantially as set forth.

5. The process of making sound records or the like which consists in pressing a heated layer of thermo plastic record composition against a sheet of fabric, and subsequently securing said layer and sheet to a suitable backing with said sheet intermediate said layer and backing, substantially as set forth.

6. The process of making sound records or the like which consists in pressing a heated layer of thermo plastic record composition against a sheet of fabric between polished plates, cooling said layer, and removing the same together with said fabric from said plates, substantially as set forth.

7. The process of making sound records or the like which consists in pressing a heated layer of thermo plastic record composition against a sheet of fabric between polished plates, cooling said layer, removing the same together with the fabric from said plates, and subsequently securing said layer and fabric to a suitable backing with said fabric intermediate said layer and backing, and forming a record impression in said layer, substantially as set forth.

8. The process of making phonograph records or the like which comprises placing upon a sheet of fabric, a layer of composition which becomes hardened by chemical action upon application of sufficient heat, heating said layer to harden the same by chemical action, and securing said layer and fabric to a suitable backing with said fabric between said layer and backing, substantially as described.

9. The process of making phonograph records or the like which comprises placing a plastic layer of a composition which becomes hardened by chemical action upon application of sufficient heat against a sheet of fabric between polished plates, heating the said layer to harden the same by chemical action, and subsequently securing said layer and fabric to a suitable backing with said fabric between said layer and backing substantially as described.

10. The process of making phonograph records or the like which comprises placing a plastic layer of a composition which becomes hardened by chemical action upon application of sufficient heat against a sheet of fabric between polished plates, heating the said layer to harden the same by chemical action, and subsequently securing said layer and fabric to a suitable backing with said fabric between said layer and backing, and forming a record impression in said layer, substantially as set forth.

11. The process of making phonograph records or the like which comprises placing a plastic layer of a composition which becomes hardened by chemical action upon application of sufficient heat against a sheet of fabric between polished plates, heating the said layer to harden the same by chemical action, and subsequently securing said layer and fabric to a thermo plastic backing with said fabric between said layer and backing substantially as described.

12. The process of making sound records or the like, which consists in rolling a heated layer of thermo-plastic record composition against a sheet of fabric, and subsequently securing said layer and sheet to a suitable backing with said sheet intermediate said layer and backing, substantially as set forth.

This specification signed and witnessed this 4th day of March, 1911.

JONAS W. AYLSWORTH.

Witnesses:
 FREDERICK BACHMANN,
 ANNA R. KLEHM.

Correction in Letters Patent No. 1,230,816.

It is hereby certified that in Letters Patent No. 1,230,816, granted June 19, 1917, upon the application of Jonas W. Aylsworth, of East Orange, New Jersey, for an improvement in "Methods of Making Phonograph-Records," an error appears in the printed specification requiring correction as follows: Page 2, line 30, for the word "cranks" read *cracks;* and that the said Letters Patent should be read with this correction therein that the same may conform to the record of the case in the Patent Office.

Signed and sealed this 20th day of November, A. D., 1917.

[SEAL.]

R. F. WHITEHEAD,
*Acting Commissioner of Patents.*

Cl. 18—48.4.